US009381830B2

(12) United States Patent
Jeong et al.

(10) Patent No.: US 9,381,830 B2
(45) Date of Patent: Jul. 5, 2016

(54) RECLINING APPARATUS FOR REAR SEAT IN A CAR

(71) Applicants: Hyundai Motor Company, Seoul (KR); Kia Motors Corp., Seoul (KR)

(72) Inventors: Chan Ho Jeong, Gunpo-si (KR); Seon Chae Na, Yongin-si (KR); Jung Sang You, Anyang-si (KR); Jun Yeol Heo, Suwon-si (KR); Sang Uk Yu, Seoul (KR); Jong Moon Yoo, Hwaseong-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 14/559,077

(22) Filed: Dec. 3, 2014

(65) Prior Publication Data

US 2016/0059741 A1    Mar. 3, 2016

(30) Foreign Application Priority Data

Aug. 28, 2014    (KR) .................. 10-2014-0113433

(51) Int. Cl.
*B60N 2/20*    (2006.01)
*B60N 2/22*    (2006.01)
*B60N 2/64*    (2006.01)

(52) U.S. Cl.
CPC .. *B60N 2/22* (2013.01); *B60N 2/20* (2013.01); *B60N 2/64* (2013.01)

(58) Field of Classification Search
CPC .............. B60N 2/015; B60N 2/01516; B60N 2/01525; B60N 2/01533; B60N 2/01541; B60N 2/01558; B60N 2/01566; B60N 2/01575; B60N 2/0224; B60N 2/0232; B60N 2/0236; B60N 2/028; B60N 2/065; B60N 2/067; B60N 2/20; B60N 2/22; B60N 2/2209; B60N 2/2245

USPC .......................................... 296/65.16, 65.17
See application file for complete search history.

(56) References Cited

U.S. PATENT DOCUMENTS

| 1,414,637 | A | * | 5/1922 | Gell | A47C 1/0323 248/420 |
| 2,837,931 | A | * | 6/1958 | Brundage | B60N 2/0224 192/141 |
| 2,983,545 | A | * | 5/1961 | Garvey | B60N 2/0232 248/419 |
| 7,452,020 | B2 | * | 11/2008 | Warsi | B60N 2/366 296/65.17 |
| 7,762,604 | B1 | * | 7/2010 | Lindsay | B60N 2/01583 296/64 |
| 8,353,552 | B2 | * | 1/2013 | Scheurer, II | B60N 2/3011 296/65.09 |
| 8,393,667 | B2 | * | 3/2013 | Hashimoto | B60N 2/0276 296/65.16 |

(Continued)

FOREIGN PATENT DOCUMENTS

KR    20-1997-0002186 U    1/1997
KR    10-2009-0024831 A    3/2009

(Continued)

*Primary Examiner* — Gregory Blankenship
(74) *Attorney, Agent, or Firm* — Morgan, Lewis & Bockius LLP

(57) ABSTRACT

A reclining apparatus for a rear seat in a car may include a plurality of links provided on both sides of a cushion frame and each being rotatably coupled at both sides to the cushion frame or a car floor, and a locking module configured to couple a back frame hinge-connected to the cushion frame with a car body and slidably and rotatably connected with the back frame so as to allow the back frame to tilt at a variable angle in response to movement of the cushion frame by the rotation of the links.

6 Claims, 3 Drawing Sheets

(56) References Cited

U.S. PATENT DOCUMENTS

| | | | | |
|---|---|---|---|---|
| 8,408,630 B2* | 4/2013 | Saito | ............... | B60N 2/366 296/65.13 |
| 8,702,172 B2* | 4/2014 | Schmodde | ............... | B60N 2/015 296/65.09 |
| 2006/0082128 A1* | 4/2006 | Clute | ............... | B60R 22/4676 280/807 |
| 2007/0085368 A1* | 4/2007 | Hirokawa | ............... | B60N 2/366 296/65.16 |
| 2007/0096497 A1* | 5/2007 | Adragna | ............... | B60N 2/2209 296/65.16 |
| 2007/0273171 A1* | 11/2007 | Ito | ............... | B60N 2/0232 296/65.16 |
| 2008/0164740 A1* | 7/2008 | Harper | ............... | B60N 2/045 297/331 |
| 2009/0230730 A1* | 9/2009 | Ohtsubo | ............... | B60N 2/0232 296/193.07 |
| 2009/0236880 A1* | 9/2009 | Villeminey | ............... | B60N 2/2209 297/188.01 |
| 2009/0322134 A1 | 12/2009 | Yamada et al. | | |
| 2010/0237673 A1* | 9/2010 | Lindsay | ............... | B60N 2/2245 297/378.13 |
| 2011/0175419 A1* | 7/2011 | Bruck | ............... | B60N 2/2245 297/364 |
| 2011/0187171 A1* | 8/2011 | Ishii | ............... | B60N 2/22 297/354.12 |
| 2011/0233982 A1* | 9/2011 | Lindsay | ............... | B60N 2/366 297/378.13 |
| 2012/0025557 A1* | 2/2012 | Lindsay | ............... | B60N 2/366 296/65.16 |
| 2013/0049425 A1* | 2/2013 | Runde | ............... | B60N 2/206 297/354.12 |
| 2013/0313850 A1* | 11/2013 | Hawkins | ............... | B60N 2/2893 296/65.16 |
| 2014/0167474 A1* | 6/2014 | Jeong | ............... | B60N 2/2209 297/354.1 |
| 2014/0327266 A1* | 11/2014 | Gholap | ............... | B60N 2/442 296/65.16 |
| 2015/0108813 A1* | 4/2015 | Muller | ............... | B60N 2/2209 297/362.11 |
| 2015/0137547 A1* | 5/2015 | Cai | ............... | B60N 2/366 296/63 |
| 2015/0165935 A1* | 6/2015 | Sachs | ............... | B60N 2/22 297/342 |

FOREIGN PATENT DOCUMENTS

| | | |
|---|---|---|
| KR | 10-2009-0131572 A | 12/2009 |
| KR | 10-2013-0068949 A | 6/2013 |
| KR | 10-1406449 B1 | 6/2014 |
| KR | 20-2015-0000160 U | 1/2015 |

* cited by examiner

RECLINING APPARATUS FOR REAR SEAT IN A CAR

CROSS REFERENCE TO RELATED APPLICATION

The present application claims priority to Korean Patent Application No. 10-2014-0113433, filed Aug. 28, 2014, the entire contents of which is incorporated herein for all purposes by this reference.

BACKGROUND OF THE INVENTION

1. Field of the Invention

The present invention relates, in general, to a reclining apparatus for a rear seat in a car and, more particularly, to a reclining apparatus for a rear seat in a car, which enables a seat back to recline along with the movement of a seat cushion.

2. Description of Related Art

Generally, a passenger car is provided with a front seat for a driver and a passenger, and a rear seat for additional passengers.

Due to spatial restriction in a car, a conventional rear seat has no reclining device, so that passenger(s) sitting on the rear seat may be disposed in an uncomfortable position compared to passenger(s) on the front seat.

To solve this problem, the related art discloses a rear seat, which includes fixed rear backs fixedly connected to both sides of a seat cushion, reclining rear backs connected to the seat cushion between the fixed rear backs in such a way as to rotate the forward-rearward direction, and each having a recliner hinge-connected to a reclining seat back via a leaf spring at one side thereof, and is provided with a gear on the other side thereof, a stopper plate fitted into the gear of the recliner, and a lever which is connected to the stopper plate via a spring, and recliners which are mounted to both sides of the reclining rear backs in such a way as to allow the reclining rear backs to rotate in the forward-rearward direction from the seat cushion.

However, this technique only enables the reclining of the seat back, but it is difficult to perform the reclining in association with the seat cushion, so it does not provide passengers on the rear seat with seating comfort.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a reclining apparatus for a rear seat in a car, which allows a seat back to tilt at a variable angle about a stationary axis in association with the movement of a seat cushion, enabling the simultaneous reclining of the seat back along with the movement of the seat cushion, thereby providing passengers with more comfortable seating feeling.

According to various aspects of the present invention, a reclining apparatus for a rear seat in a car may include a plurality of links provided on both sides of a cushion frame and each being rotatably coupled at both sides to the cushion frame or a floor, and a locking module configured to couple a back frame hinge-connected to the cushion frame with a car body and slidably and rotatably connected with the back frame so as to allow the back frame to tilt at a variable angle in response to movement of the cushion frame by the rotation of the links.

At least one link of the plurality of links may be provided, on one side thereof to be coupled with the floor, with an elastic part serving to assist in rotation of the link.

The back frame may be coupled to one side of the both sides of the cushion frame at one end thereof, and the elastic part may assist in the rotation of the link for the movement towards another side of the both sides of the cushion frame.

The apparatus may further include a lead screw provided between the cushion frame and the floor, and a drive apparatus coupled with one side of the lead screw so as to rotate the lead screw according to an operating signal, in which another side of the lead screw and the drive apparatus are respectively coupled to either the cushion frame or the floor so as to move the cushion frame as the lead screw rotates.

The locking module may include a striker coupled to any one of the back frame and the car body, and a latch coupled to another of the back frame and the car body so as to engage with or disengage from the striker.

The striker may be rotatably and slidably coupled to the back frame and the latch may be coupled to the car body.

The apparatus may further include a connection bracket which is fixed to the back frame and is rotatably and slidably coupled to the striker at one side thereof.

The connection bracket may be provided on an end thereof with a vertical slit, and the striker may be slidably and rotatably coupled to the end of the connection bracket by a hinge pin to be inserted into the slit.

The back frame may be rotatably coupled to the cushion frame at a lower end thereof, and may be foldable when the striker and the latch are disengaged from each other.

According to the reclining apparatus of the rear seat in a car, the rear seat can have a reclining function with simple configuration although it is not equipped with an expensive electric reclining device, thereby obtaining high cost competitiveness and improved consumer satisfaction.

Further, the seat back and the seat cushion can move at the same time so as to increase a change in the reclining angle, thereby improving the passenger's seating comfort and thus vehicle merchantability.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
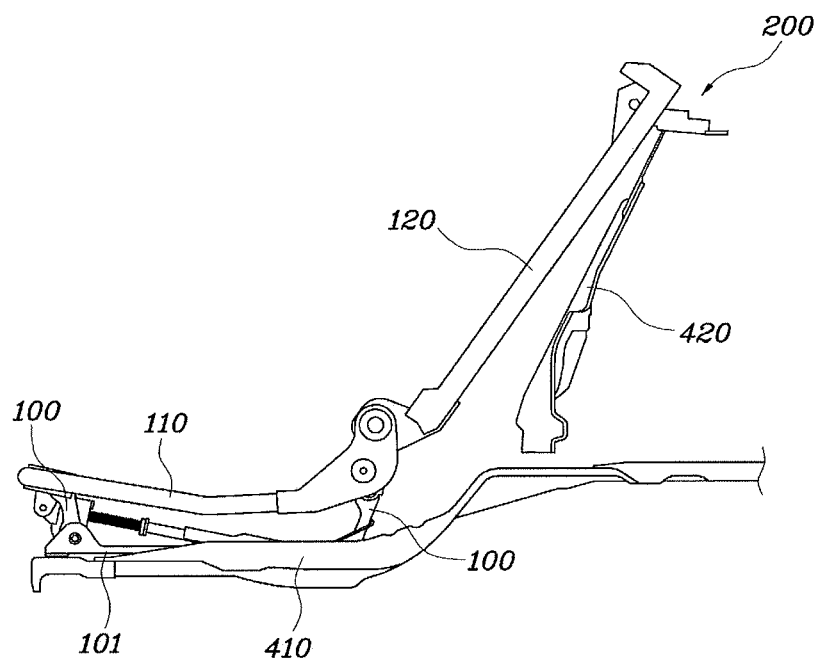
FIG. 1 is a view showing an exemplary reclining apparatus of a rear seat in a car according to the present invention, which is in a reclined state.
Figure 2:
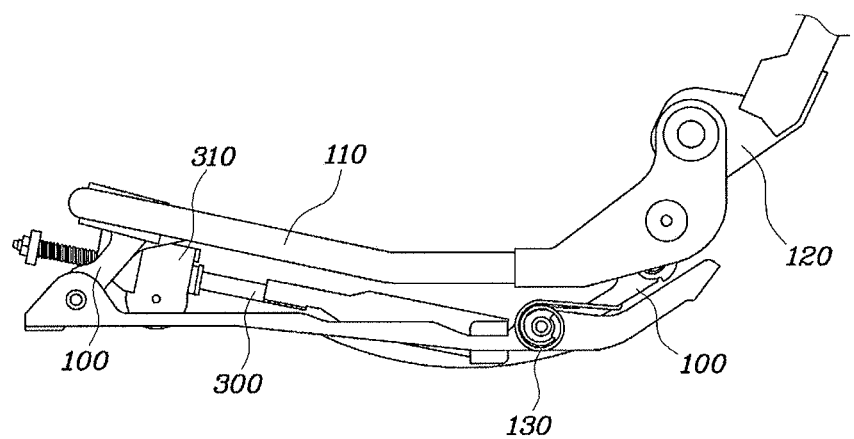
FIG. 2 is a view showing a cushion frame of the exemplary reclining apparatus before being reclined according to the present invention.
Figure 3:
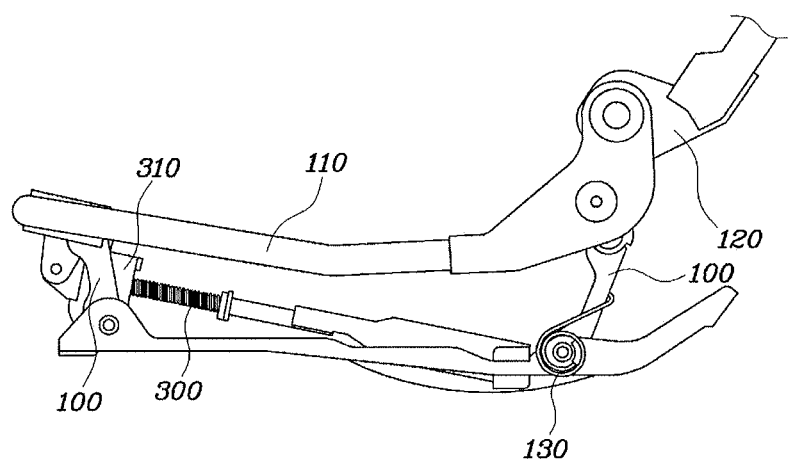
FIG. 3 is a view showing the cushion frame being reclined of the exemplary reclining apparatus according to the present invention.
Figure 4A:
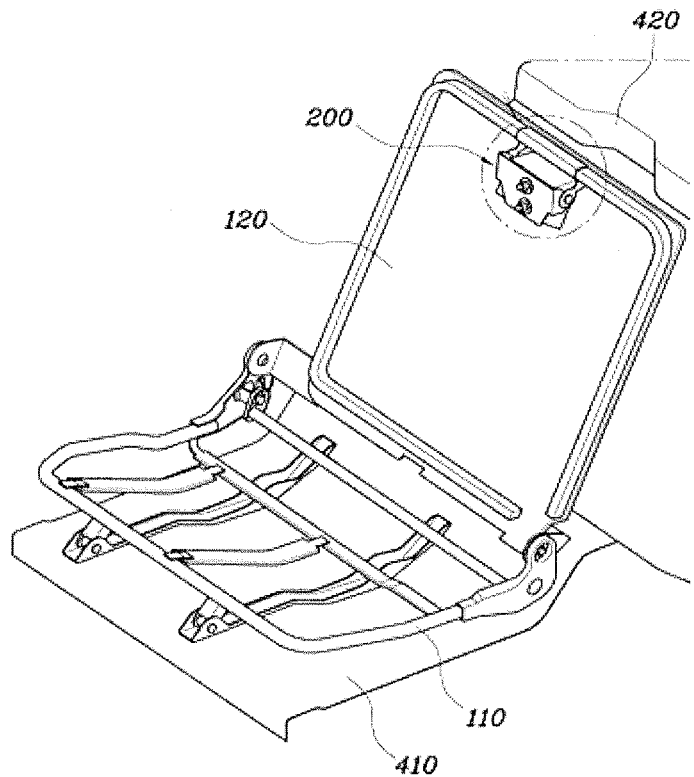
FIG. 4A and FIG. 4B are views showing a locking module of the exemplary reclining apparatus according to the present invention.
Figure 4B:
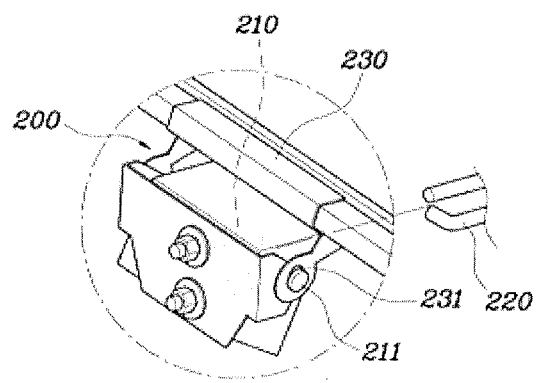

FIG. 1 is a view showing a reclining apparatus of a rear seat in a car according to various embodiments of the present invention, which is in a reclined state; FIG. 2 is a view showing a cushion frame of the reclining apparatus before being reclined; FIG. 3 is a view showing the cushion frame being reclined; and FIG. 4A and FIG. 4B are views showing a locking module of the reclining apparatus according to various embodiments of the present invention.

As shown in FIG. 1, a reclining apparatus of a rear seat in a car includes a plurality of links 100 provided on both sides of a cushion frame 110 and each rotatably coupled at both sides thereof to the cushion frame 110 or the floor 410, and a locking module 200 configured to couple a back frame 120 hinge-connected to the cushion frame 110 with a car body and slidably and rotatably connected with the back frame 120 so as to allow the back frame 120 to tilt at a variable angle in response to the movement of the cushion frame 110 by the rotation of the links 100.

Specifically, the back frame 120 supporting the passenger's back is preferably hinge-connected, at a lower end thereof, to a rear end of the cushion frame 110 in order to rotate relative to the cushion frame. Particularly, the back frame 120 is preferably foldably coupled to the cushion frame 110. This is implemented for realizing the folding of the seat back when the back frame 120 and the car body 420 are disengaged from each other by means of the locking module 200. A detailed description thereof will be followed later.

Specifically, the plurality of links 100 may preferably be provided on both sides of the cushion frame 110 at front and rear ends thereof. Each of the links 100 is hinge-coupled between the floor 410 and the cushion frame 110 at one side thereof and the other side thereof, so as to allow the cushion frame 110 to move back and forth. Of course, a variety of embodiments may be realized in the coupling methods, and more links 100 may be provided. Further, at one site where the respective link 100 is provided, a plurality of links, rather than a single link, may be provided in a connected state so as to connect the cushion frame 100 and the floor 410 together. Further, when reclining is not performed, each of the links 100 is preferably disposed such that the other side faces the rear side of the cushion frame, in order to secure a maximum reclining coverage.

Although the other side of the link 100 may be coupled directly to the floor 410, it may be coupled via a bracket 101 to which the other side of the link on the front or rear side of the cushion frame 110 is coupled. The bracket 101 is coupled to the floor 410 directly or via a movement rail or the like, so as to allow the cushion frame 110 to be able to slidably move in the longitudinal direction of a car.

As shown in FIG. 2, at least one of the links 100 is provided, on one side to be coupled with the floor 410, with an elastic part 130 serving to assist in rotation of the link 100. The elastic part 130 is preferably mounted such that it applies an auxiliary force to assist the forward rotation of the link 100. The elastic part may use various kinds of elastic members, including a torsion spring, a coil spring and the like.

With the provision of elastic part, when the cushion frame 110 and the back frame 120 are reclined, the cushion frame 110 can be more smoothly moved forward.

As shown in FIG. 2 and FIG. 3, the apparatus may further include a lead screw 300 provided between the cushion frame 110 and the floor 410 and a drive unit 310 coupled with one side of the lead screw 300 so as to rotate the lead screw 300 according to an operating signal. The other side of the lead screw 300 and the drive unit 310 are respectively coupled to either the cushion frame 110 or the floor 410 so as to move the cushion frame 110 back and forth as the lead screw 300 rotates.

Preferably, the drive unit 310 may be hinge-coupled to the front side of the cushion frame 110 and the other side of the lead screw 300 may be hinge-coupled to the floor 410 corresponding to the rear side of the cushion frame 110. Then, as shown in FIG. 3, when the drive unit 310 rotates, the cushion frame 110 can move forward along the radius of rotation of the link 100, and reclining can be precisely controlled by the control of rotation of the drive unit 310. Of course, the drive unit 310 may be mounted to the floor 410, and the other side of the lead screw may be coupled to the cushion frame. The drive unit 310 may preferably be provided with a motor. The drive unit 310 may be driven by a controller (not shown) that is separately provided to control the drive unit 310, or via a switch (not shown) directly connected to the drive unit 310 and which is operated by direct manipulation of a user.

In addition to the lead screw 300 and the drive unit 310, a hydraulic cylinder can be used. In this case, a separate lever may be provided in order to control the extension and contraction of the hydraulic cylinder. Of course, beside the lead screw 300 or the hydraulic cylinder, various types of actuators can be used in order to move the cushion frame 110 forwards or rearwards.

FIG. 4A and FIG. 4B show the locking module 200 that may be provided between the car body 420, which is opposite to the back frame 120, and the back frame 120. The locking module includes: a striker 210 coupled to any one of the back frame 120 and the car body 420; and a latch 220 coupled to the other of the back frame 120 and the car body 420 so as to engage with or disengage from the striker 210. Preferably, the striker 210 may be rotatably and slidably coupled to the back frame 120, and the latch 220 may be fixed to the car body 420, or vice versa.

The locking module 200 easily performs the engagement and disengagement since it consists of the striker 210 and the latch 220. Upon engagement, the back frame maintains a state being coupled to the car body 420, and upon disengagement the back frame 120 is ready to be foldable. Particularly, since the striker 210 is rotatably and slidably coupled to the back frame 120, the back frame 120 is rotatable about a coupling point with the striker 210 as a rotation axis, with the striker 210 and the latch 220 engaged with each other, thereby facilitating the simultaneous reclining of the cushion frame 110 and the back frame 120.

Referring in more detail to the locking module 200 using FIG. 4A and FIG. 4B, the locking module may further include a separate connection bracket 230 fixed to the back frame 120 at one side thereof and rotatably and slidably coupled to the striker 210 at the other side thereof. Since the striker 210 and the back frame 120 are mutually coupled via the separate connection bracket 230, at the coupling region, a high strength material may be used compared to the back frame 120, and the engagement can be firmly maintained on the back frame 120 without damage, such as cracking.

Further, the connection bracket 230 may be provided on an end thereof with a vertical slit 231, and the striker 210 may be slidably and rotatably coupled to the end of the connection bracket 230 by means of a hinge pin 211 to be inserted into the slit 231.

Since the link 100 rotates so as to move the cushion frame 110 forwards, the cushion frame 110 and the back frame 120 move upward to a specified level as the link 100 rotates as shown in FIG. 3. Here, the vertical slit 231 shown in FIG. 4A and FIG. 4B facilitates the upward movement of the connection bracket 230 and the back frame 120 to the specified level. Further, when the link 100 is moved down again after reaching the topmost raising level, the back frame 120 can also be moved down together, thereby performing reclining. Thus, it is preferred that the size and dimension of the slit 231 be set diversely by tests along the movement routes of the back frame 120 by the rotation of the link 100.

Further, the vertical slit 231 restricts the forward-rearward movement of the hinge pin 211, so that, upon the forward movement of the cushion frame 110, the back frame rotates about the hinge pin 211, rather than moving forwards. Thus, the back frame 120 is reclined while taking a variable angle according to the movement of the cushion frame 110.

Although the above-mentioned embodiments have set the forward-rearward direction, horizontal direction or the like with the assumption that the seat is mounted facing the forward of a car, these positions are merely illustrative of relative positions of the respective elements. Thus, the forward-rearward direction may become one direction or the other direction, and even when the seat is mounted facing the lateral side of a car, the set direction may change.

According to the reclining apparatus of the rear seat in a car, the rear seat can have a reclining function with simple configuration although it is not equipped with an expensive electric reclining device, thereby obtaining high cost competitiveness and improved consumer satisfaction.

Further, the seat back and the seat cushion can move at the same time so as to increase a change in the reclining angle, thereby improving the passenger's seating comfort and thus vehicle merchantability.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A reclining apparatus for a rear seat in a car, the apparatus comprising:
    a plurality of links provided on both sides of a cushion frame and each being rotatably coupled at both sides to the cushion frame or a car floor;
    a locking module configured to couple a back frame hinge-connected to the cushion frame with a car body and slidably and rotatably connected with the back frame so as to allow the back frame to tilt at a variable angle in response to movement of the cushion frame by the rotation of the links,
    wherein the locking module comprises:
        a striker coupled to at least one of the back frame and the car body; and
        a latch coupled to another of the back frame and the car body so as to engage with or disengage from the striker, and
    wherein the striker is rotatably and slidably coupled to the back frame and the latch is coupled to the car body; and
    a connection bracket that is fixed to the back frame and is rotatably and slidably coupled to the striker at one side thereof.

2. The reclining apparatus according to claim 1, wherein at least one link of the plurality of links is provided, on one side thereof to be coupled with the floor, with an elastic part serving to assist in rotation of the link.

3. The reclining apparatus according to claim 2, wherein the back frame is coupled to one side of the both sides of the cushion frame at one end thereof, and the elastic part assists in the rotation of the link for the movement towards another side of the both sides of the cushion frame.

4. The reclining apparatus according to claim 1, further comprising:
    a lead screw provided between the cushion frame and the floor; and
    a drive apparatus coupled with one side of the lead screw so as to rotate the lead screw according to an operating signal,
    wherein another side of the lead screw and the drive apparatus are respectively coupled to either the cushion frame or the floor so as to move the cushion frame as the lead screw rotates.

5. The reclining apparatus according to claim 1, wherein the connection bracket is provided on an end thereof with a vertical slit, and the striker is slidably and rotatably coupled to the end of the connection bracket by a hinge pin to be inserted into the slit.

6. The reclining apparatus according to claim 1, wherein the back frame is rotatably coupled to the cushion frame at a lower end thereof, and is foldable when the striker and the latch are disengaged from each other.

* * * * *